United States Patent [19]

Hoppie et al.

[11] Patent Number: 4,531,719
[45] Date of Patent: Jul. 30, 1985

[54] ELASTOMERIC MEMBER FOR ENERGY STORAGE DEVICE

[75] Inventors: Lyle O. Hoppie; Richard Chute, both of Birmingham, Mich.

[73] Assignee: Eaton Corporation, Cleveland, Ohio

[21] Appl. No.: 469,618

[22] Filed: Feb. 25, 1983

[51] Int. Cl.³ .............................................. B60G 11/18
[52] U.S. Cl. ................................ 267/57.1 R; 138/109; 185/37; 192/4 A; 267/153; 267/154; 464/97
[58] Field of Search ............ 267/154, 153, 57, 57.1 R, 267/57.1 A, 63 R, 63 A, 141; 188/373, 371; 185/37, 39; 403/221, 228, 229, 286; 138/109, 127; 285/114, 235; 293/133; 464/97, 182, 181, 97; 192/4 A, 2

[56] References Cited

U.S. PATENT DOCUMENTS

| | | | |
|---|---|---|---|
| 2,305,644 | 12/1942 | Stone | 285/114 X |
| 3,291,507 | 12/1966 | Clay | 285/114 |
| 3,690,639 | 9/1972 | Brandon et al. | 267/57.1 A |
| 3,883,102 | 5/1975 | Trigg | 403/291 X |
| 4,315,562 | 2/1982 | Tangorra et al. | 185/37 |
| 4,333,553 | 6/1982 | Hoppie et al. | 185/9 X |
| 4,478,777 | 10/1984 | Hoppie et al. | 267/153 |

FOREIGN PATENT DOCUMENTS 4550 of 1876 United Kingdom ............... 138/127

*Primary Examiner*—Duane A. Reger
*Assistant Examiner*—Michael P. Gilday
*Attorney, Agent, or Firm*—C. H. Grace; P. S. Rulon

[57] ABSTRACT

An energy storage device (10) is disclosed consisting of a stretched elongated elastomeric member (16), disposed within a tubular housing (14), which elastomeric member (16) is adapted to be torsionally stressed to store energy. The elastomeric member (16) is configured in the relaxed state with a uniform diameter body section, transition end sections, and is attached to rigid end piece assemblies (22, 24) of a lesser diameter. The profile and deflection characteristic of the transition sections (76, 78) are such that upon stretching of the member, a substantially uniform diameter assembly results to minimize the required volume of the surrounding housing (14). During manufacture, woven wire mesh sleeves (26, 28) are forced against a forming surface and bonded to the associated transition section (76, 78) to provide the correct profile and helix angle. Each sleeve (26, 28) contracts with the contraction of the associated transition section to maintain the bond therebetween.

2 Claims, 6 Drawing Figures

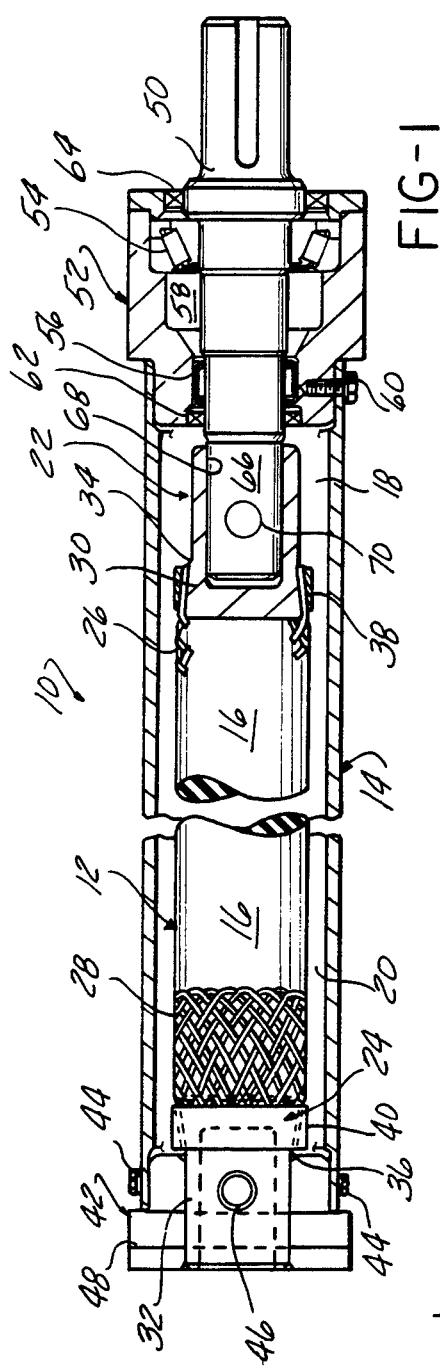
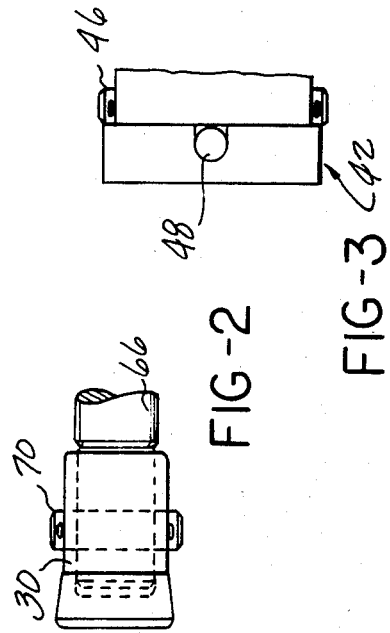
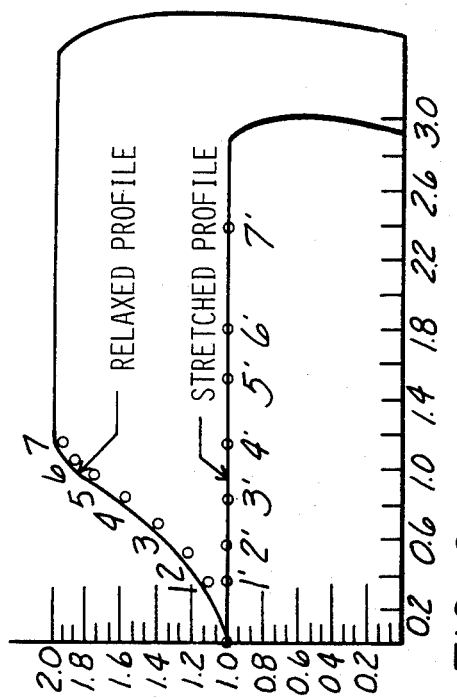

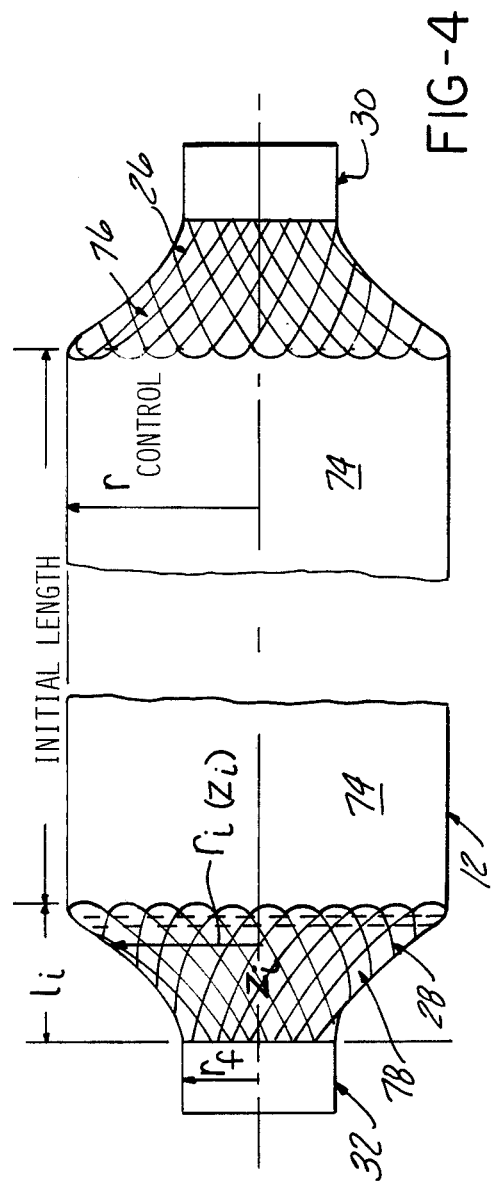
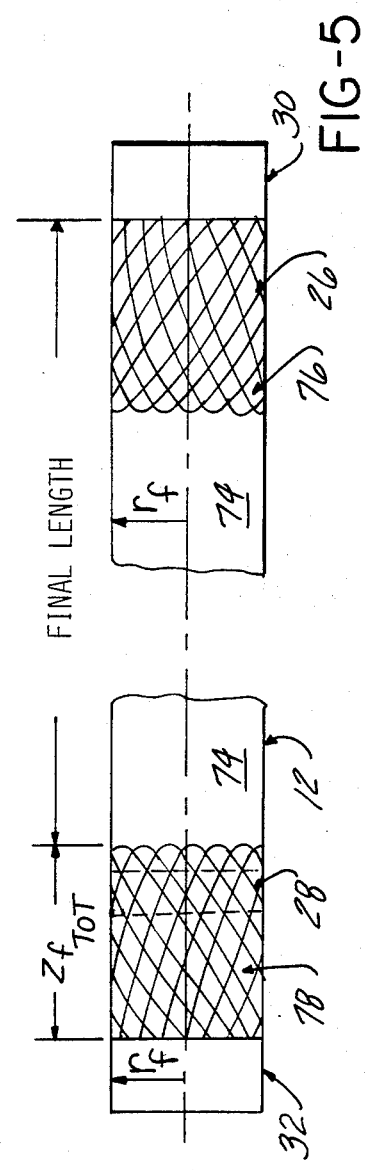

ELASTOMERIC MEMBER FOR ENERGY STORAGE DEVICE

GOVERNMENT RIGHTS STATEMENT

The U.S. Government has rights to this invention pursuant to Contract W-7405-ENG-48 awarded by the U.S. Department of Energy and Subcontract 2617509 awarded by the University of California, Lawrence Livermore Laboratory.

CROSS REFERENCE TO RELATED APPLICATION

Cross reference is made to a commonly assigned, related application Ser. No. 469,617, filed Feb. 25, 1983, now U.S. Pat. No. 4,478,777, entitled "Method For Making An Elastomeric Member With End Pieces."

BACKGROUND OF THE INVENTION

This invention concerns energy storage devices such as are used in regenerative braking systems for storing and releasing the energy normally dissipated in the braking of vehicles so that this energy may be utilized in vehicle propulsion.

This invention is specifically concerned with providing an elastomeric member and device such as may be usable in energy regenerative systems utilizing a torsionally stressed elongated elastomeric member.

The present invention is related to inventions described in U.S. Pat. Nos. 4,246,988; 4,305,489; 4,310,079; 4,319,655; 4,333,553, describing regenerative braking systems.

In these patents, a regenerative braking system and energy storage device is disclosed including such an elongated elastomeric member which is torsionally stressed in order to absorb braking energy. As described in U.S. Pat. No. 4,333,553, it is advantageous to axially prestress the elastomeric member since the member has a tendency to knot at predetermined torsional stress levels, and the tendency to form a knot is decreased by applying an axial or stretching tension on the elastomeric member.

The knotting tendency is a disadvantage since the fatigue life of the elastomeric member is greatly affected by knotting during the stressing cycles.

It is desirable to enclose such an elastomeric member by mounting it within a confining housing in order to protect the member from the environment, and to provide a safety shield.

The axial prestressing is achieved by stretching and results in a very substantial difference in diameter of the elastomeric member in its relaxed and stretched conditions.

In the interest of conserving space, it is desirable that the housing be of a diameter no larger than is necessary to receive the elastomeric member in its stretched condition.

It is also highly desirable that a sure and reliable mechanical connection to the ends of the elastomeric member be provided while allowing a constant diameter assembly.

DISCLOSURE OF THE INVENTION

The present invention seeks to provide an elastomeric member assembly for use as an energy storage device of the general type described, which is formed with a main body section and transition sections at each end in turn connected to rigid end pieces of a diameter corresponding to the final stretched diameter of the elastomeric member main body section.

Reinforcement means for each of the transition sections is provided which absorbs a portion of the tensile forces in order to produce a controlled axial elongation of each region of the transition sections. This precludes necking down of the transition sections resulting from excessive elongation and establishes an overall uniform diameter of the stretched member.

The reinforcement takes the form of a plurality of helically wound strands, which preferably are formed into woven wire mesh sleeves, molded into the surface of the transition sections. The windings contract radially and extend axially during stretching of the elastomeric member in correspondence with the transition sections themselves and provide the appropriate reinforcement of the elastomeric material composing the transition sections.

BRIEF DESCRIPTION OF THE DRAWINGS

FIG. 1 is a sectional view of an energy storage device incorporating an elastomeric member assembly according to the present invention.

FIG. 2 is a fragmentary view of the end piece and a method of connection thereto to an input/output shaft.

FIG. 3 is a fragmentary view of the end piece connected to the fixed end of the elastomeric member assembly shown in FIG. 1.

FIG. 4 is a diagrammatic representation of the elastomeric member assembly in its relaxed state.

FIG. 5 is a diagrammatic representation of the elastomeric member assembly in its stretched condition.

FIG. 6 is a graphical plot depicting the location of surface points on one of the transition sections of the elastomeric member as stretching elongation of the elastomeric member assembly takes place.

DETAILED DESCRIPTION

Referring to FIG. 1, an energy storage device 10 is shown, which includes an elastomeric member assembly 12 mounted within a housing 14. The elastomeric assembly 12 includes an elastomeric member 16 which in its stretched, axially-elongated condition is reduced in diameter, allowing it to be fit within an interior space 18 within the housing. As can be seen in FIG. 1, the elastomeric member assembly 12 is generally cylindrical in shape and of substantially uniform diameter, in its stretched condition, so that the housing interior 18 may also be substantially uniform in diameter, with a minimum radial clearance space 20 provided therebetween.

The elastomeric member assembly 12 includes an elastomeric member 16 which is secured to rigid end piece assemblies 22 and 24 by virtue of wire meshes 26 and 28. This securement is achieved by means of helically wound or woven reinforcing strands, here formed into wire mesh sleeves 26 and 28, which are secured as by bonding onto the transition section of the elastomeric member 16 so as to be securely joined thereto.

The wire mesh sleeves 26 and 28 are also secured to the respective end piece assemblies 22 and 24 by being received over respective tapered forward ends of inner end pieces 30 and 32 and may be bonded by brazing as indicated at 34 and 36.

The left-hand end of the elastomeric member assembly 12 as viewed in FIG. 1 is fixed up to the housing 14 by means of an end plug 42 secured to the housing 14 by means of bolts 44.

As best seen in FIG. 3, a first cross pin 46 passes transversely through the inner end piece 32 and a pin 48 passes through the large diameter protruding section of the end plug 42, to thus provide a means for anchoring one end of the elongated member assembly 12 to the housing 14.

The right-hand, opposite end of the elastomeric member assembly 12 is affixed to an input/output shaft 50 rotatably mounted in an endcap assembly 52 by means of a thrust roller bearing 54 and needle bearing 56. The right-hand end of the housing member 14 is fixed by means of machine screws 60 to the end cap assembly 52. Seals 62 and 64 seal the interior 58 of the housing 52. The left-hand end 66 of the input/output shaft 50 protrudes into the interior of housing member 14, and is received with a bore 68 formed in inner piece 30. A drive pin 70 establishes a rotative driving connection therebetween as best seen in FIG. 2.

A thrust bearing 54 and the cross pins 46 and 48 provide means for maintaining the elastomeric member 16 in an elongated stretched condition such as to provide a prestressing thereof for the purpose as described above.

It can be seen from an inspection of FIG. 1 that the elastomeric member assembly 12 is of substantially uniform diameter such as to be housed within the interior space 18 within housing member 14 with substantially constant clearance space therebetween. This allows a relatively compact volume of the energy storage device 10, comprised of the elastomeric member assembly 12, surrounding housing 14, and mechanical connections and supports described.

The elastomeric member 16 is of a molded "elastomeric" material, which term, for definitional purposes, here is deemed to include natural rubber compounds. The member 16 includes a main body section 74 of substantially constant diameter in both the initial unstretched condition as shown in FIG. 4, and in the stretched axially elongated condition shown in FIG. 5. There is a corresponding reduction in diameter due to the separation of the end pieces indicated diagrammatically as 30 and 32, since the material is not significantly compressible, and its volume is the same relaxed or stretched.

Stretching is achieved by axial separation of the end pieces 30 and 32 causing length-wise elongation of the body section 74, and, as noted since the volume of material contained in the body section 74 remains constant, a corresponding reduction in diameter occurs. Such reduction is substantially uniform since the axial elongation is substantially uniform for each segment of the body section 74.

Each of the end piece assemblies 22 and 24 are preselected to be of a diameter corresponding to the designed for, final, stretched-down diameter of the body section 74.

The elastomeric member 16 also has integral homogeneous transition sections 76 and 78 of the same elastomeric material, which transition from the larger diameter of the body section 74 to the smaller diameter of the substantially rigid end piece assemblies 22 and 24.

The diameter of each segment of the transition sections 76 and 78 must be in correspondence with the extent of axial elongation at each segment such that each segment will reduce in diameter to the final diameter $r_f$. However, it can also be understood that the separating force is exerted throughout the length of the elastomeric member 16. Since the cross sectional area of each segment of the transition section 76, 78 is lesser than the main body section 74, the transition sections would be stressed at higher levels. If the modulus of the transition sections is the same as the body section 74, the elongation would inevitably be greater, such that neckdown of the material would occur in the transition zone, excessively stressing the material in these regions and leading to a potential early fatigue failure.

According to the concept of the present invention, the transition sections 76, 78 are reinforced by helical windings of reinforcing strands wound or woven about, and bonded to, the surface of the transitional sections 76 and 78. The helical windings provide a tensile reinforcing of the transitional sections 76, 78 to control the axial elongation of each segment of the transition sections 76, 78. This controlled elongation produces a tensile "deflection characteristic" related to the profile of the transition section such that upon axial separation of the end pieces 22, 24 the transition sections 76, 78 will be contracted radially to a substantially uniform diameter of the same diameter as that of the stretched main body section. At the same time, the helically wound reinforcing strands accommodate the axial elongation.

The profile of the transition sections 76, 78 and the helix angle of the reinforcing strands are such that the change in position of each portion of the helical reinforcing windings resulting from the axial elongation of the member 16 is in correspondence with the change in position of the corresponding points on the surface of the transition sections 76, 78. Thus, excessive stressing of the bond between the helical reinforcing windings and the transition sections 76, 78, does not occur which would otherwise tend to weaken or destroy the connection therebetween.

Such a reinforcement is advantageously provided by the wire mesh sleeves 26 and 28, each consisting of sets of oppositely wound and woven individual strands bonded or molded into a respective transitional section 76 or 78 with one end of the sleeves 26 and 28 welded or otherwise secured as described above to a respective end piece 22 or 24. Such woven and oppositely wound wire strands simultaneously provide a means by which a torque applied in either direction can be supported in the otherwise weak transition sections.

As can be understood from the above description, it is firstly required that the sleeves follow the surface of the elastomer as it is elongated so that the sleeves remain an integral part of the surface. Secondly, it is required that neither the mesh nor the elastomer undergo significant elongation in the vicinity of the end pieces since the diameter is the desired final value prior to elongation. Consequently, the elastomer adjacent the end piece is virtually free of tensile stress, whereas the sleeve adjacent the end piece accommodates virtually all of the tensile load. Thirdly, it is required that the mesh and elastomer undergo the full desired elongation and corresponding reduction in diameter at the ends opposite the end pieces. Thus the elastomer there accommodates virtually all of the tensile load whereas the sleeves are virtually free of tensile stress. Hence, there is a smooth transfer of tensile load from the elastomer to the mesh and thence to the end pieces. As can be appreciated, the profile of the transition section and the orientation of the wire strands cannot be arbitraily chosen if these requirements are to be satisfied.

The following analysis provides a mathematical solution to determining the various required parameters for a particular application:

FIG. 4 shows the elastomeric member 16 and sleeves of wire mesh 26, 28 in the initial (unstretched) condition. In the initial relaxed state, the radius of the surface, $r_i$, of each region of the transition sections 76, 78 is a function of its axial position, $z_i$, and this is written $r_i(z_i)$.

FIG. 5 shows the elastomeric member 16 and lengths of wire mesh 26, 28 in the final (stretched) condition. The goal is to have a uniform radius in the final condition and a uniform pitch angle of the reinforcing strands in the final condition.

The material in the body section 74 is to be stretched such that its final to initial length ratio is $\lambda$; this requires that the initial to final radius ratio be $\lambda^{\frac{1}{2}}$.

Consider the small element of rubber and the small element of the wire mesh sleeve on the surface of this rubber indicated by the dashed lines in transition section 78. Initially the dashed lines are separated by the small distance $dz_i$, whereas after elongation they are separated by the amount $dz_f$. Initially, the radius of the element of rubber is $r_i(z_i)$ and after elongation it is the desired value, $r_f$. In order that the volume of this element of rubber be preserved, it is necessary that $$r_i^2(z_i)dz_i = r_f^2 dz_f \qquad (1)$$

It should be clear that as the length and the radius of the element of rubber change according to the above equation, the orientation of each of the small wires comprising the small element of the wire mesh sleeve must change if it is to remain an integral part of the surface. That is, both the pitch angle and the angle of the profile relative to the axis of the elastomer must change in a prescribed manner which can mathematically be expressed as $$(r_i(z_i)d\phi)^2 + (dr_i)^2 + (dz_i)^2 = (r_f d\phi)^2 + (dz_f)^2 \qquad (2)$$

where $d\phi$ is the small angle defined by the ends of the small segment of wire mesh in question.

Let the ratio of $r_i(z_i)$ to $r_f$ be called $f(z_i)$, i.e., $$f(z_i) = \frac{r_i(z_i)}{r_f} \qquad (3)$$

Note that at $z_i = 0$, $f = 1$, and at $z_i = l_i$, $f = \lambda^{\frac{1}{2}}$ where $l_i$ is the initial length of the transition section.

Equations (1)-(3) are combined to give the differential equation:

$$\frac{r_f d\phi}{dz_i} = \left[ \frac{f^4(z_i) - r_f^2 \left( \frac{df(z_i)}{dz_i} \right)^2 - 1}{f^2(z_i) - 1} \right]^{\frac{1}{2}} \qquad (4)$$

From FIG. 5, the final pitch angle, $\theta$, is seen to be proportional to the ratio of $r_f$ to $z_{fTot}$, where $z_{fTot}$ is the stretched length of the sleeves 26, 28 and $r_f$ is the radius of the stretched sleeves 26, 28. Furthermore, since the final pitch angle is a constant, $$\tan \theta = \frac{r_f d\phi}{dz_f} = C \text{ (a constant)}$$

But, $dz_f = f^2(z_i)dz_i$, so $r_f(d\phi/dz_i) = Cf^2(z_i)$ and Eq. 4 becomes:

$$Cf^2(z_i) = \left[ \frac{f^4(z_i) - r_f^2 \left( \frac{df(z_i)}{dz_i} \right)^2 - 1}{f^2(z_i) - 1} \right]^{\frac{1}{2}} \text{ or,} \qquad (5)$$

$$\frac{r_f df(z_i)}{dz_i} = [-Cf^6(z_i) + (1 + C^2)f^4(z_i) - 1]^{\frac{1}{2}} \qquad (6)$$

For the transition sections 76, 78 to be smooth and continuous with the body section 74:

$$C = \frac{\sqrt{\lambda + 1}}{\lambda} = \tan \theta \qquad (7)$$

This condition results in less criticality in fitting the mesh lengths 26, 28 to the transition sections 76, 78.

The solution to Eq. (6) with the value of C given by Eq. (7) is:

$$z_i = r_f \sqrt{\frac{\lambda}{2\lambda + 1}} \int_0^x \frac{dy}{\left( 1 - \frac{\lambda - 1}{2\lambda + 1} \sin^2 y \right)^{\frac{1}{2}}} \qquad (8)$$

where $$x = \sin^{-1} \left( \frac{\lambda}{\lambda - 1} \frac{f^2 - 1}{f^2} \right)^{\frac{1}{2}} \qquad (2)$$

Eq. (8) gives the profile of the transition zone. It is found by:

(1) Picking values of $f = r_i(z_i)/r_f$ between 1 and $\lambda^{\frac{1}{2}}$ where $$\lambda = \frac{\text{Desired final length of the body section 74}}{\text{Initial length of the body section 74}}$$

(2) Find x from Eq. (9)

(3) Evaluate the integral of Eq. (8) to find the value of $z_i$ that corresponds to a specific f.

In a similar manner, an equation relating the final axial location, $z_f$, of a point on the surface of the transition section 74, 76, can be written in terms of the original $f(z_i)$:

$$z_f = r_f \sqrt{\frac{\lambda}{2\lambda + 1}} \int_0^x \frac{dy}{\left( 1 - \frac{\lambda - 1}{\lambda} \sin^2 y \right) \left( 1 - \frac{\lambda - 1}{2\lambda + 1} \sin^2 y \right)^{\frac{1}{2}}} \qquad (10)$$

where $$x = \sin^{-1}\left(\frac{\lambda}{\lambda - 1} \cdot \frac{f^2 - 1}{f^2}\right)^{\frac{1}{2}} \quad (11)$$

In particular, the final length of the mesh 26, 28 is found from above with $f^2 = \lambda$, i.e., $x = \pi/2$:

$$z_{fTot} = r_f \sqrt{\frac{\lambda}{2\lambda + 1}} \int_0^{\pi/2} \frac{dy}{\left(1 - \frac{\lambda - 1}{\lambda} \sin^2 y\right)\left(1 - \frac{\lambda - 1}{2\lambda + 1} \sin^2 y\right)^{\frac{1}{2}}} \quad (12)$$

For example, if $\lambda = 4$, the value of $z_i$ can be found for any value of f between $f = 1$ and $f^2 = \lambda = 4$ from:

$$z_i = \tfrac{2}{3} r_f \int_0^x \frac{dy}{(1 - \tfrac{1}{4}\sin^2 y)^{\frac{1}{2}}} \; ; \; x = \sin^{-1}\left(\frac{4}{3} \cdot \frac{f^2 - 1}{f^2}\right)^{\frac{1}{2}}$$

In terms of the original value of $f(z_i)$, the axial location of a point on the surface after elongation is given by:

$$z_f = \tfrac{2}{3} r_f \int_0^x \frac{dy}{(1 - \tfrac{3}{4}\sin^2 y)(1 - \tfrac{1}{4}\sin^2 y)^{\frac{1}{2}}}$$

The final pitch angle (which will be uniform in the Final Transition Zone) is give by:

$$\tan \theta = 5/4 = 0.559, \text{ or } \theta = 29.2°$$

FIG. 6 shows several points (1 through 7) on the surface of the relaxed transition sections 76, 78 for the case $\lambda = 4$. After elongation of the elastomeric member 16, the points 1 through 7 become the points 1' through 7' on the final surface. Note that the total length of the mesh after stretching is:

$$z_{fTot} = \tfrac{2}{3} r_f \int_0^{\pi/2} \frac{dy}{(1 - \tfrac{3}{4}\sin^2 y)(1 - \tfrac{1}{4}\sin^2 y)^{\frac{1}{2}}} = 2.39 \, r_f$$

In order to manufacture an elastomeric member assembly according to the above described concepts, there is initially determined the stretch ratio $\lambda$ desired for the particular application.

For such $\lambda$ there is a specific pitch angle of the windings of the wire mesh sleeves 26, 28.

Wire mesh sleeves 26, 28 of appropriate pitch angle may then be constructed for the desired final stretched radius with the individual length of wire mesh held at the stretched or final radius. The appropriate length of the sleeve may be trimmed, such length being calculated from the above described equation for $z_{fTot}$.

The sleeves 26, 28 are then secured to the end piece assemblies 22, 24 as described above. A profile defining rigid member is then constructed having a profile which is in accordance with the above described equations.

Each wire mesh sleeve 26, 28 is then positioned against a support member, and deformed so as to insure contact with the profile of the support members, as by contacting the transition sections 76, 78 which may also be caused to conform to the correct profile at the same time, as by a molding step. The sleeves 26, 28 are then bonded to the elastomer to complete the manufacturing process.

Such bonding may be achieved by a molding-in process in which the support member forms a part of the mold cavity as described in co-pending patent application, Ser. No. 469,617, filed on 02/25/83, assigned to the same assignee as the present application.

The bonding process may involve precoating or plating of the mesh, or other techniques well known to those skilled in that art. The details thereof do not form a part of the present invention, and thus are not here included.

The resulting structure provides a very secure connection between the end pieces and the elastomeric member absorbing both tensile and torsional loads so as to provide an energy storage device having very extended service life, and with a high degree of reliability in field performance. At the same time, the components thereof are relatively easily manufactured at relatively low cost.

As described above, the transition sections 76, 78 have an elongation or deflection characteristic which corresponds with each of their profiles such that deflection occurs in each segment tending to conserve the volume of rubber, i.e., a degree of axial elongation will occur under an endwise separating force to cause a reduction in diameter to the final diameter.

Alternative arrangements for producing such deflection characteristic may be provided as described in co-pending application, Ser. No. 469,619, filed on 02/25/83.

Accordingly, it can be appreciated that the above objects of the present invention provide the means by which a prestressed elastomeric member may be housed within the confines of a constant diameter housing of minimum cross sectional dimension.

At the same time, a reliable connection to the elastomeric member for inputting of the torsional and stretching loads are also afforded by the construction of the embodiments described.

It may be appreciated that there are many variations in the approach whereby the deflection characteristics of the transition sections may be controlled in order to product this result.

We claim:

1. A prestressed energy storage device comprising
   an elastomeric member having a main body section of substantially constant diameter, a transition section at each end thereof having a diameter smaller than said diameter of said body section, and a substantially rigid end piece affixed to each transition section;
   an elongated housing having an internal passage of substantially uniform cross-sectional area configured to receive said elastomeric member in a stretched condition;
   mounting means for mounting said elastomeric member within said housing in a stretched condition, said mounting means allowing one end thereof to be rotated while the other end remains fixed, to enable energy storage by windup of said elastomeric member;

said end pieces and stretched elastomeric member being of a substantially constant diameter to provide a uniform clearance between said housing opening and said stretched elastomeric member assembly; and wherein each end piece has secured thereto a sleeve of helically wound wire mesh, each sleeve secured to and receiving one of said transition sections for transmitting forces effecting stretch and windup of the elastomeric member.

2. The energy storage device according to claim 1 wherein said wire mesh sleeves are woven.

* * * * *